(12) United States Patent
Adolf et al.

(10) Patent No.: US 11,092,746 B1
(45) Date of Patent: Aug. 17, 2021

(54) POST-FABRICATION PHOTONIC PERFORMANCE TUNING

(71) Applicant: X Development LLC, Mountain View, CA (US)

(72) Inventors: Brian John Adolf, San Mateo, CA (US); Martin Friedrich Schubert, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/719,489

(22) Filed: Dec. 18, 2019

(51) Int. Cl.
  *G02B 6/293* (2006.01)
  *G02B 6/02* (2006.01)
(52) U.S. Cl.
  CPC ..... *G02B 6/29335* (2013.01); *G02B 6/02123* (2013.01); *G02B 2006/02166* (2013.01)
(58) Field of Classification Search
  CPC ............ G02B 6/29335; G02B 6/02123; G02B 2006/02166; G02B 6/29334
  USPC .......................................................... 385/30
  See application file for complete search history.

(56) References Cited

U.S. PATENT DOCUMENTS

| | | | | |
|---|---|---|---|---|
| 6,356,681 B1 * | 3/2002 | Chen | ................... | G02B 6/02123 372/102 |
| 6,408,119 B1 * | 6/2002 | Meltz | ................... | G02B 6/2835 385/31 |
| 6,456,762 B1 * | 9/2002 | Nishiki | ............... | G02B 6/02138 385/37 |
| 6,477,194 B1 | 11/2002 | Eng | | |
| 6,681,067 B1 * | 1/2004 | Kersey | ............... | G02B 6/02085 359/566 |
| 6,768,850 B2 * | 7/2004 | Dugan | ................... | G02B 6/122 385/124 |
| 6,847,762 B2 * | 1/2005 | Sweetser | ............ | G02B 6/02138 385/11 |
| 6,946,684 B2 | 9/2005 | Shigihara | | |
| 6,956,994 B2 * | 10/2005 | Bernard | ............... | G02B 5/1857 359/34 |

(Continued)

OTHER PUBLICATIONS

J. N. Damask, PhD thesis, 1996.*

(Continued)

*Primary Examiner* — Robert Tavlykaev
(74) *Attorney, Agent, or Firm* — Fish & Richardson P.C.

(57) ABSTRACT

Methods, systems, and apparatus, including computer programs encoded on a computer storage medium, for tuning photonic device performance. In one aspect, a method includes receiving an initial photonic device configuration including multiple coupling structures and multiple photonic components. A first amount of light coupling between a first photonic component and a second photonic component of the multiple photonic components is received, which depends upon a subset of the coupling structures that are located between the first photonic component and the second photonic component. One or more coupling structures of the subset of coupling structures located between the first photonic component and the second photonic component are determined to be removed to cause the light coupling between the first photonic component and the second photonic component to change from the first amount of coupling to a target amount of coupling.

17 Claims, 8 Drawing Sheets

(56) References Cited

U.S. PATENT DOCUMENTS

| | | | |
|---|---|---|---|
| 8,380,027 B2* | 2/2013 | Reed | G02B 6/12007 385/37 |
| 2003/0186142 A1* | 10/2003 | Deshmukh | G03F 7/001 430/30 |
| 2004/0028104 A1 | 2/2004 | Buda | |
| 2004/0196884 A1 | 10/2004 | Ohkubo | |
| 2005/0226558 A1* | 10/2005 | Kim | G02B 6/29334 385/37 |
| 2006/0078258 A1* | 4/2006 | Anisimov | G02B 6/2821 385/50 |
| 2008/0013581 A1 | 1/2008 | Kobayashi | |
| 2008/0089374 A1 | 4/2008 | Eichler | |
| 2011/0102799 A1* | 5/2011 | Matejka | G01N 21/7743 356/448 |
| 2016/0164260 A1 | 6/2016 | Chua | |
| 2017/0179680 A1 | 6/2017 | Mahgerefteh | |
| 2018/0024297 A1* | 1/2018 | Bovington | G02B 6/12007 385/14 |
| 2020/0226221 A1 | 7/2020 | Lu et al. | |

OTHER PUBLICATIONS

"Design of Grating-Assisted Waveguide Couplers with Weighted Coupling" by Winick, Journal of Lightwave Technology, vol. 9, No. 11, pp. 1481-1491, 1991.*
Chandler, "New system allows optical "deep learning"," Jun. 2017, retrieved on Oct. 9, 2018, retrieved from URL <http://news.mit.edu/2017/new-system-allows-optical-deep-learning-0612>, 3 pages.
Lee et al., "Metasurface eyepiece for augmented reality," Nature Communications, Nov. 2018, 10 pages.
Molesky, "Outlook for inverse design in nanophotonics," https://arxiv.org/abs/1801.06715, Jan. 2018, 13 pages.
Piggott et al., "Fabrication-constrained nanophotonic inverse design," Scientific Reports, May 2017, 7 pages.
Piggott et al., "Supplementary Information: Fabrication-constrained nanophotonic inverse design," retrieved from URL <https://static-content.springer.com/esm/art%3A10.1038%2Fs41598-017-01939-2/MediaObjects/41598_2017_1939_MOESM2_ESM.pdf>, May 2017, 10 pages.
Tahersima et al., "Deep Neural Network Inverse Design of Integrated Nanophotonic Devices," https://arxiv.org/abs/1809.03555, Sep. 2018, 8 pages.

* cited by examiner

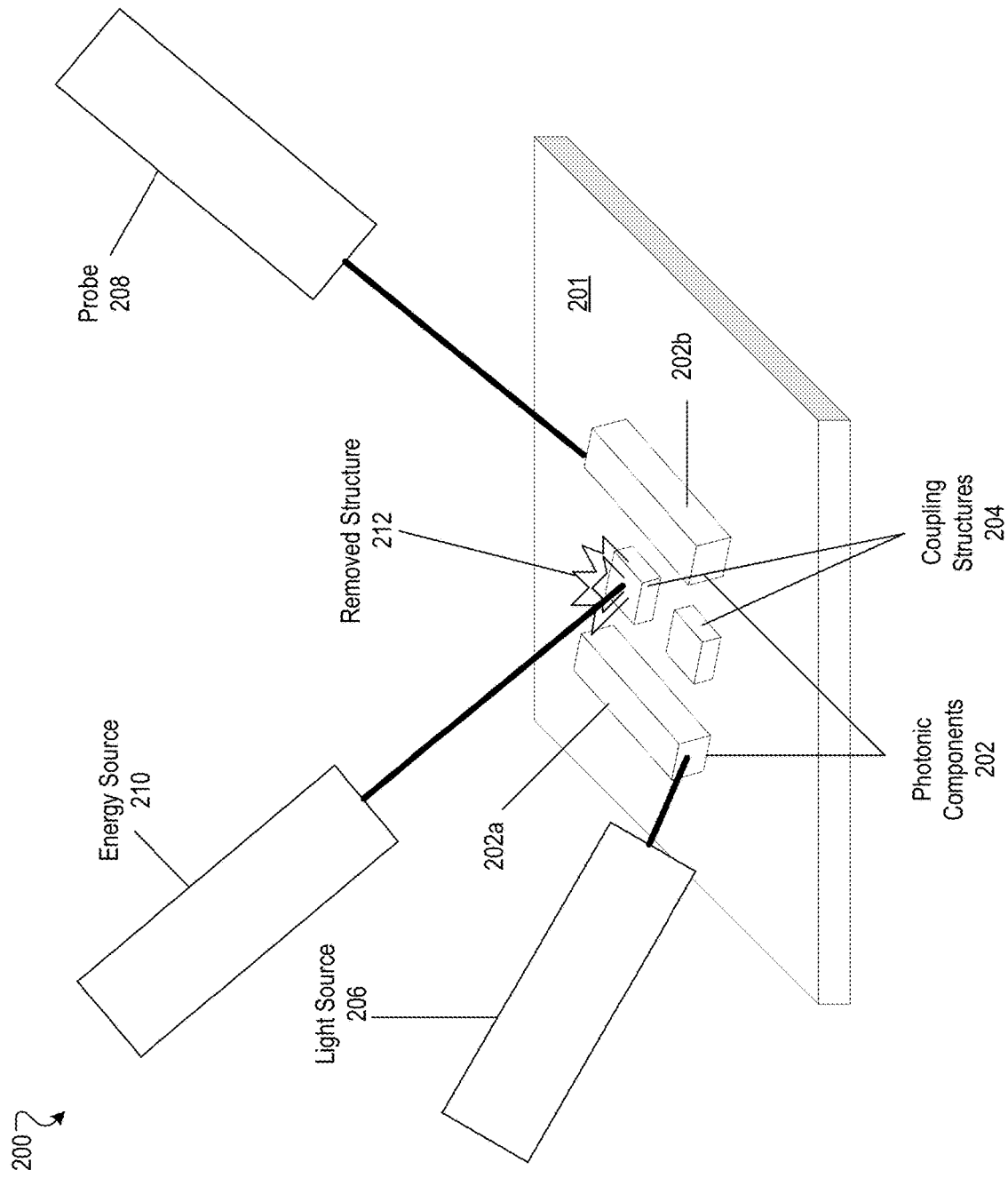

POST-FABRICATION PHOTONIC PERFORMANCE TUNING

BACKGROUND

Photonic devices are widely used in applications involving the generation, manipulation, and/or detection of light, including light at ultraviolet, visible, and infrared wavelengths. This specification relates to tuning photonic device performance.

SUMMARY

This specification describes technologies relating to post-fabrication photonic performance tuning via destruction of evanescent coupled connections. The technology selectively destroys evanescently-coupled connections between two photonic components to adjust an amount of light coupling between the two photonic components, e.g., reduce or eliminate the amount of light coupling between the two photonic components.

In general, one innovative aspect of the subject matter described in this specification can be embodied in methods that include the actions of receiving an initial photonic device configuration comprising a plurality of coupling structures and a plurality of photonic components. A first amount of light coupling between a first photonic component and a second photonic component of the plurality of photonic components is received, where the first amount of light coupling between the first photonic component and the second photonic component depends upon a subset of the coupling structures that are located between the first photonic component and the second photonic component. A target amount of light coupling between the first photonic component and the second photonic component is received, the target amount of light coupling between the first photonic component and the second photonic component being different that the first amount of light coupling. A computer system determines which one or more coupling structures of the subset of coupling structures located between the first photonic component and the second photonic component to remove, wherein removing the one or more coupling structures causes light coupling between the first photonic component and the second photonic component to change from the first amount of coupling to the target amount of coupling.

Other embodiments of this aspect include corresponding systems, apparatus, and computer programs, configured to perform the actions of the methods, encoded on computer storage devices.

These and other embodiments can each optionally include one or more of the following features. In some implementations, the determination to remove the particular coupling structure includes defining a loss function within a simulation space composed of a plurality of voxels, the simulation space encompassing the photonic device including the subset of coupling structures and the first photonic component and the second photonic component, the loss function corresponding to a target light coupling profile. The target light coupling profile includes a relationship between the subset of coupling structures that are located between the first photonic component and the second photonic component and an amount of evanescent coupling of an electromagnetic field between the first photonic component to the second photonic component via the subset of coupling structures. Using a computer system, values for at least one structural parameter and/or at least one functional parameter are determined to calculate a loss determined according to the loss function, where the at least one parameter corresponds to a structure of the photonic device, and a final structure of the photonic device is defined based on the values for the one or more structure and/or functional parameters. Determining values for the at least one structural parameter and/or the at least one functional parameter can include using a finite-difference time domain solver to solve Maxwell's equations.

In some implementations, the determination to remove the particular coupling structure includes empirical measurements performed on the photonic device including measuring an amount of light coupling between the first photonic component and the second photonic component.

In some implementations, the determination to remove the particular coupling structure includes utilizing a performance model to determine expected performance of photonic components and select which photonic components should be isolated from the photonic device by removing coupling structures to the photonic component.

In some implementations, the methods further include removing the one or more coupling structures of the subset of coupling structures located between the first photonic component and the second photonic component. Removing the coupling structure can include using a high powered energy source to alter or destroy the coupling structure.

In some implementations, the multiple coupling structures are pillars and the multiple photonic components include one or more of a waveguide, a quantum dot, or a resonator.

Other embodiments of this aspect include corresponding systems, apparatus, and computer programs, configured to perform the actions of the methods, encoded on computer storage devices.

Among other advantages, this technology enables precise tuning of an amount of light coupling between photonic components in a post-fabrication process, and/or selection of light coupling to a specific photonic component from multiple photonic components. Device performance can be tuned and/or behavior of the device can be altered without large-scale device layout changes. An excess of structures can be fabricated, thereby increasing yield of usable devices, and faulty or malfunctioning devices/structures can be removed in a post-processing step. Additionally, in some implementations, a set of fabricated chips can be batch-processed and each of the set of fabricated chips can then be individually tuned to a specific amount of light coupling, reducing tooling costs of the fabrication process (e.g., reducing mask costs, development cost of new layouts, etc.). By utilizing batch-processing of the set of fabricated chips and tuning performance in a post-fabrication step, a time to market can be reduced and precision of device performance can be increased.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A shows an example of an empirical test setup for selecting coupling structures to remove from the photonic device.

DETAILED DESCRIPTION

Figure 1:
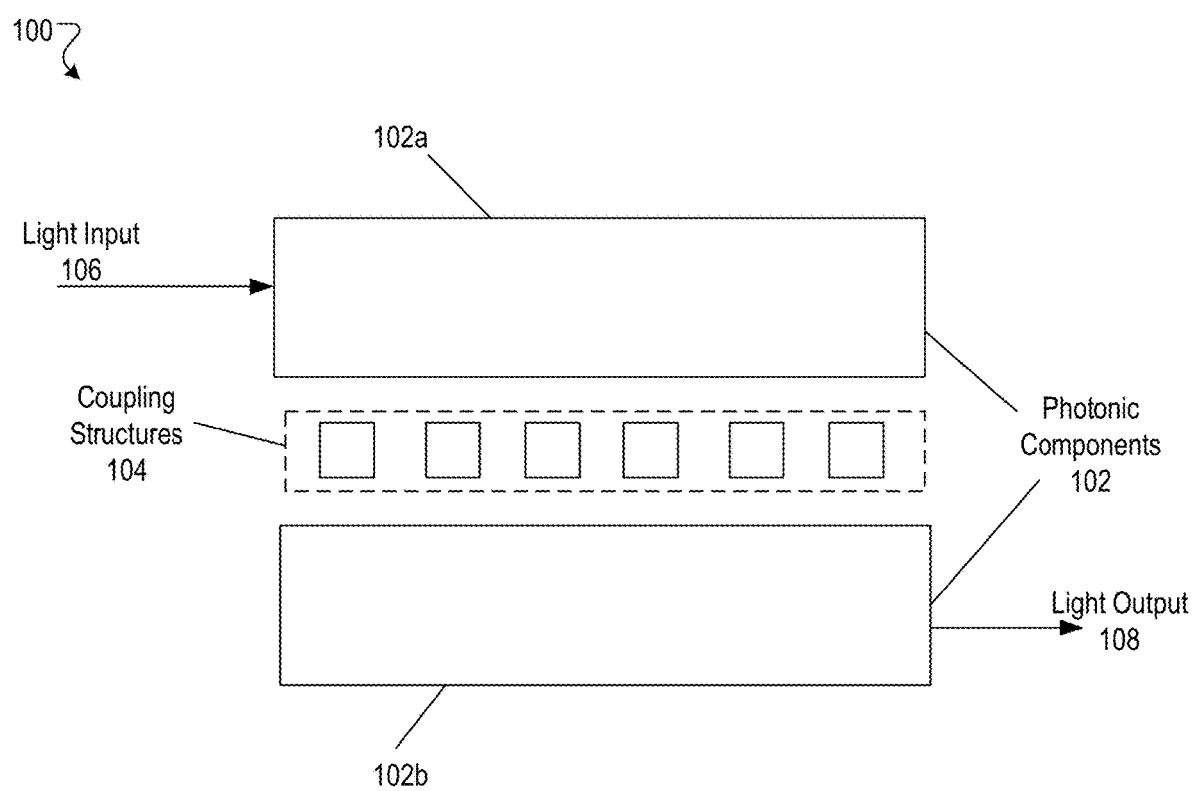
FIG. 1 shows an example layout of a photonic device including photonic components and coupling structures.

The technology of this patent application relates to using post-fabrication removal of coupling structures to alter an amount of evanescent coupling between photonic components (e.g., waveguides, quantum dots, grating couplers) of a photonic device. The technology utilizes a removal tool, for example, a laser tuned to a wavelength that is absorbed by the material of the structures, to destroy or modify a coupling structure thereby tuning a precise amount of coupling between two different photonic components that utilize the coupling structure for evanescent coupling. Other removal tools, such as a focused ion beam or physical probe, can also be used.

In some implementations, a series of pillars are used by a first waveguide to couple energy into a second, different waveguide via evanescent coupling. By removing one or more of the pillars, an amount of evanescent coupling from the first waveguide to the second waveguide via the pillars is reduced. In certain embodiments, quantum dot devices are manufactured where a resonator can be coupled to a quantum dot via evanescent coupling to a coupling structure between the quantum dot and resonator (e.g., a pillar located physically between the resonator and quantum dot). For quantum dot devices where the quantum dots are not located in a desired location (e.g., because of a limitation in a growth process for the quantum dot), the structure can be removed to decouple the resonator from the system. In certain other embodiments, multiple different grating couplers are fabricated on a photonic device, where a particular grating coupler can be selected for the photonic device and coupling into the other grating couplers can be severed by removing the coupling structures for the respective other grating couplers.

In some implementations, determining which coupling structure to remove can be done by one or more of empirical methods, computational simulations, or using an inverse design tool. In one example, empirical methods can be used to measure an amount of coupling between two photonic components and one or more coupling structures can be subsequently removed iteratively while taking coupling measurements until a target amount of coupling between the two photonic components is achieved.

In another example, determining to remove a particular coupling structure can be done using computational simulations and a performance model, e.g., to determine expected performance of photonic components and select which photonic components should be isolated from the photonic device by removing coupling structures to the photonic component.

In yet another example, determining to remove a particular coupling structure can be done using a computational inverse design tool with forward simulation to determine how the photonic device including multiple photonic components and multiple coupling structures will behave. A simulation area including at least a portion of the photonic device is divided into voxels where a gradient of a loss function can be calculated for each voxel of the set of voxels that define the simulation area. Each voxel can be sub-wavelength in resolution for particular wavelengths of interest. A finite-difference time domain method including multiple time-steps is modified to use tensor-flow methodology to mimic a convolutional neural network such that a solution (e.g., a gradient approximation) to the differentiable Maxwell's equations at each time-step can be found by gradient descent. The simulation area can be parameterized to include/exclude the structures through which features of the photonic device are evanescently coupled to predict a precise outcome (e.g., an exact desired amount of coupling). The computational inverse design tool can be used to accurately select particular coupling structures to destroy in real-time to yield the precise amount of coupling between features.

FIG. 1 shows an example layout of a photonic device 100 including photonic components 102 and coupling structures 104. A photonic component 102 is an optoelectronic component that can generate, manipulate, or detect light. Photonic components 102 can include, for example, resonators, waveguides, photodetectors (e.g., single-photon detectors), and the like. Multiple photonic components 102 can be integrated into a photonic integrated circuit on a substrate (e.g., a wafer) to form a photonic device 100. In some implementations, photonic components 102 can be composed of semiconductor material, metallic/semi-metallic material, insulator material, or a combination thereof. In one example, a composition of a waveguide photonic component includes silicon and silicon-on-insulator (SOI) materials.

In some implementations, a photonic device 100 can incorporate one or more plasmonic components, e.g., a plasmonic waveguide, plasmonic resonator, or the like. The photonic device 100 may include coupling of surface plasmon polaritons.

A coupling structure 104 is a feature that can couple an amount of light, by way of evanescent coupling, between two or more photonic components 102. A coupling structure can be a pillar, a bar, a quantum dot, or another feature of the photonic device 100 that facilitates evanescent coupling of a waveform between two or more photonic components 102. In some implementations, a coupling structure 104 is a feature or physical structure of the photonic device 100 that is between two more photonic components 102 and enhances (e.g., increases) or facilitates an amount of coupling of light between the two or more photonic components 102 by evanescent coupling via the coupling structure 104. A set of coupling structures 104 can be located between two photonic components 102 (e.g., one coupling structure, three coupling structures, ten coupling structures, etc.), where each coupling structure 104 of the multiple coupling structures 104 contributes a fractional amount of light coupling of a total amount of light coupling between the two photonic components 102.

In some implementations, coupling structures 104 can be composed of semiconductor material, metallic/semi-metallic material, insulator material, or a combination thereof. In one example, a composition of a coupling structure includes silicon. In another example, a composition of a coupling structure includes aluminum deposited onto a substrate. More generically, materials utilized to fabricate waveguide structures, e.g., waveguide core and cladding, or other structures designed to guide and/or refract light of wavelength(s) of interest can be used to evanescently couple fields between structures.

In some implementations, an amount of light coupling between a first photonic component 102a and a second photonic component 102b is a difference in an amount of light from an input 106 of the first photonic component 102a to an amount of light at an output 108 of the second photonic component 102b. In one example, the first photonic device and the second photonic devices are waveguides, and an amount of light coupling between the two waveguides is a difference between an amount of light into input 106 of the first waveguide and measuring an amount of light from output 108 of the second waveguide. Details of empirical and theoretical determinations of the amount of light coupling are discussed below with reference to FIGS. 2A-2C.

An amount of coupling between two photonic components 102 can be modified based in part by modifying the subset of coupling structures 104 that are located between the two photonic components 102 and that participate in coupling evanescent waves that are associated with the two photonic components 102. Modifying the subset of coupling structures 104 can include removing one or more coupling structures 104 from the subset of coupling structures, altering one or more characteristics of one or more coupling structures 104 from the subset of coupling structures (e.g., changing a shape, position, material composition, or the like), or a combination thereof.

In some implementations, a coupling structure 104 can be modified to alter an amount of light coupling through the coupling structure 104. A modification can be, for example, removing a portion or all of the coupling structure 104 (e.g., using a high-energy laser pulse), altering a position of the coupling structure (e.g., a position relative to the two photonic components), or modifying the material compositions (e.g., through thermal annealing, deposition of additional materials, etching, or the like). For example, a coupling structure 104 can be modified by thermal annealing, where an amount of evanescent coupling through the coupling structure 104 can depend on a material composition and resulting efficiency of evanescent coupling. In another example, a coupling structure 104 can be modified by etching a portion of the coupling structure which may reduce an amount of light that can be evanescently coupled through the coupling structure 104. In yet another example, a coupling structure 104 can be removed or destroyed sufficiently from the photonic device 100, e.g., using a high-energy laser pulse, such that no evanescent coupling is possible through the coupling structure 104.

Figure 2B:
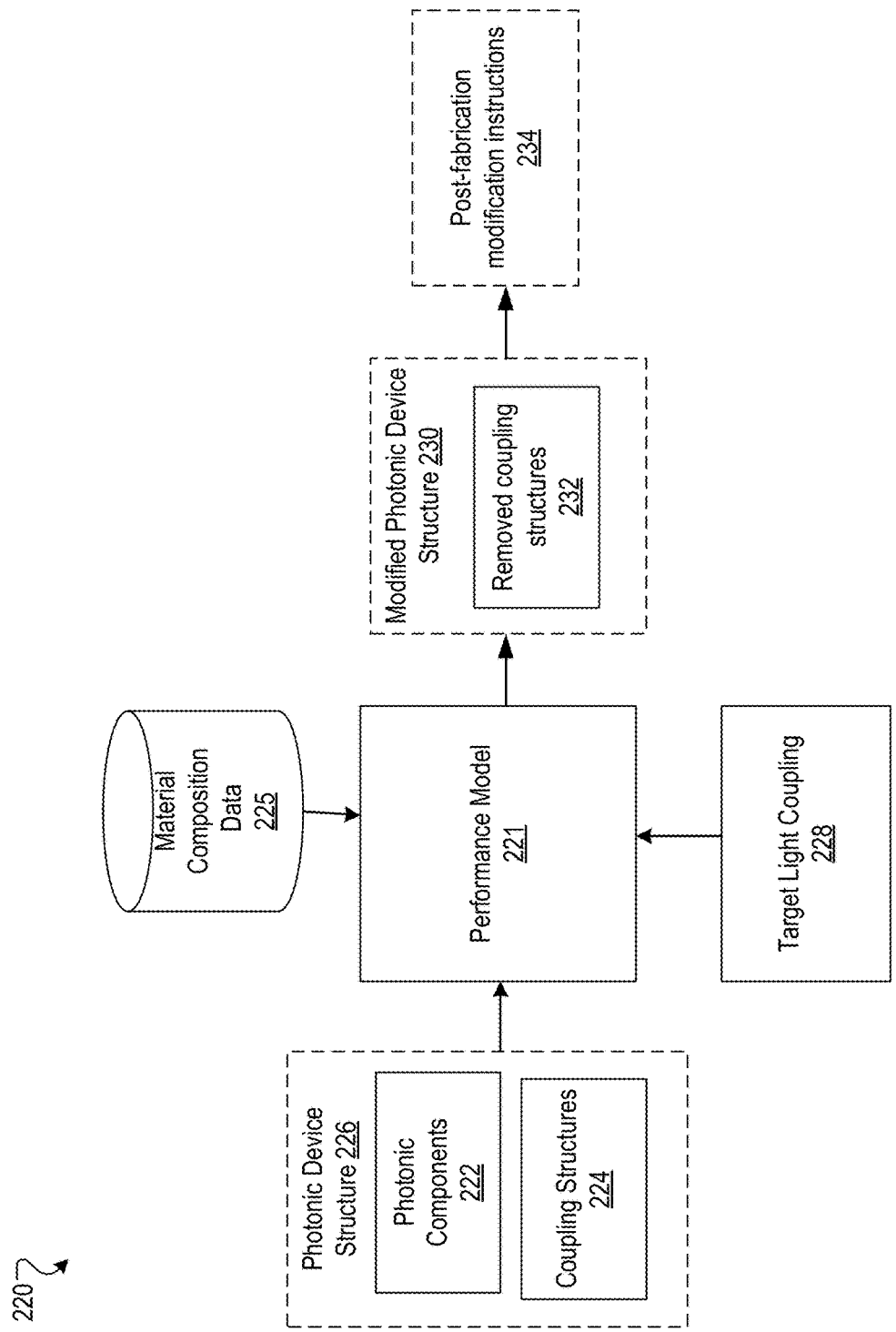
FIG. 2B is a block diagram of an example operating environment for using a performance model to select coupling structures to remove from the photonic device.
Figure 2C:
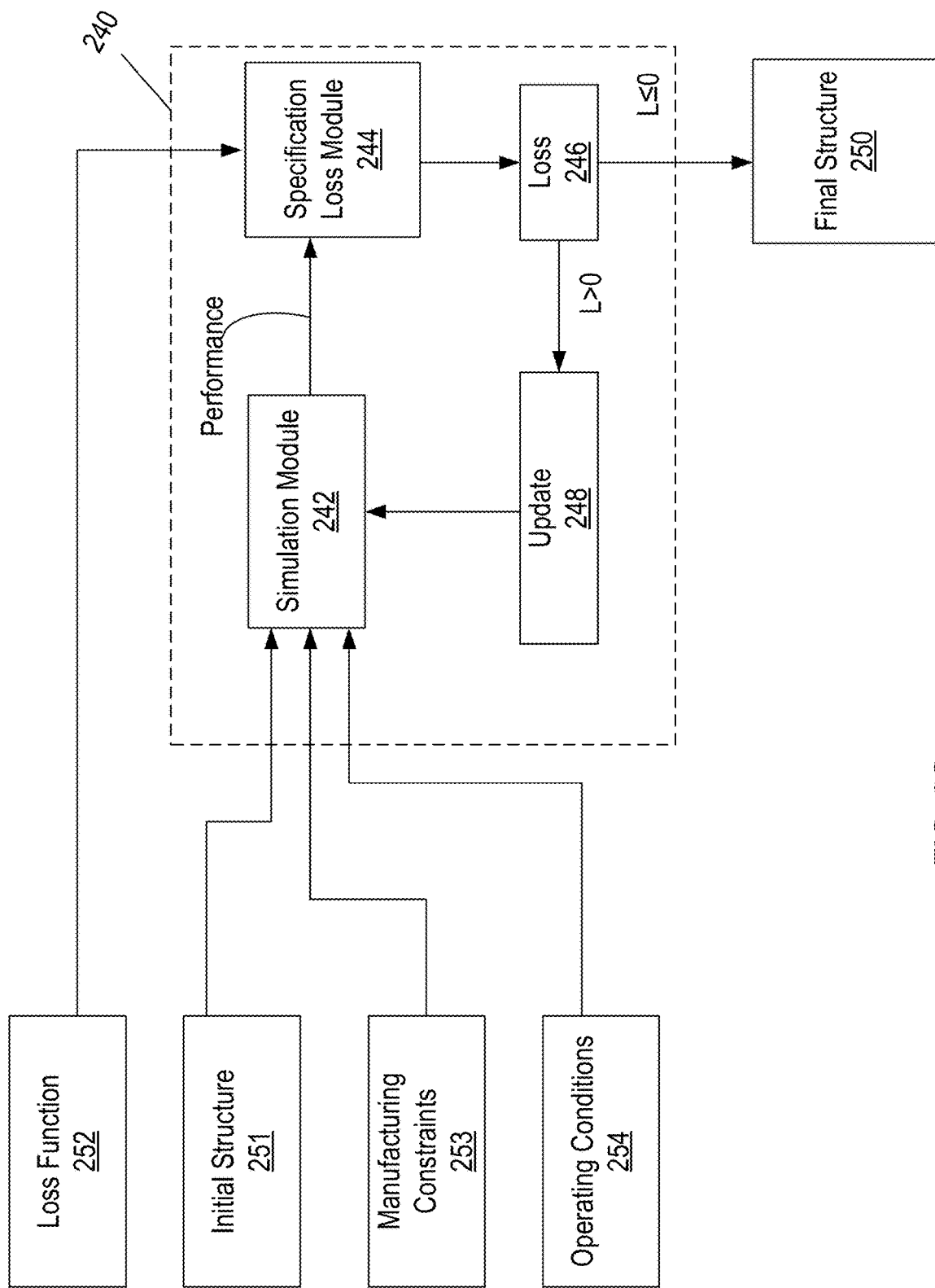
FIG. 2C is a block diagram of an example operating environment 240 for using an inverse-design tool approach to select coupling structures to remove from a photonic device.

One or more coupling structures of a subset of coupling structures 104 located between two photonic components 102 can be modified in order to modify an amount of light coupling between the two photonic components (e.g., from a first photonic component to a second photonic component and vice versa) and tune performance of the photonic device 100. Determining the one or more coupling structures 104 to modify can be done empirically, theoretically, or using a combination thereof. FIGS. 2A-2C are exemplary methods for determining one or more coupling structures 104 to modify in the photonic device. Though described in FIGS. 2A-2C as three separate methods, a combination of any of the three methods described may be utilized to determine one or more coupling structures 104 to modify for the photonic device 100.

FIG. 2A shows an example empirical test setup 200 including photonic device 201, photonic components 202 and coupling structures 204. Empirical test setup 200 can be used to determine one or more coupling structures 204 to remove from the photonic device 201. In some implementations, empirical test setup 200 includes a light source 206 for coupling light into a first photonic component 202a, a probe 208 for measuring an amount of light at an output of a second photonic component 202b, and an energy source (e.g., a laser) 210.

In one embodiment, determining to remove a particular coupling structure includes empirical measurements performed on the photonic device 201 including coupling an amount of light into the first photonic component 202a using light source 206 and measuring an amount of light output at the second photonic component 202b, or vice versa. Though described with reference to FIG. 2A as light input at the first photonic component 202a and measuring a light output at the second photonic component 202b, light coupling between the two photonic components 202 can be determined in an inverse manner.

Light source 206 can be, for example, a laser source of a particular wavelength or set of wavelengths. Light source 206 can instead be a non-laser light source, for example, a super-luminescent light-emitting diode (LED), a halogen lamp, full-spectrum light source, or the like. Light source 206 can be coupled into photonic component 202a via free-space coupling (e.g., illuminating a portion or all of photonic component 202a), through an optical fiber, or another method of coupling light into the photonic component.

Measuring an amount of light coupling between the first photonic component 202a and the second photonic component 202b can be performed using probe 208. Probe 208 can be, for example, an optoelectronic detector (e.g., a photodiode, a pyroelectric detector, a thermopile, a photo-resistance measurement system, an infrared detector, photon-counting module, or the like). A particular probe 208 can be selected, for example, based on a wavelength of light that is being detected at photonic component 202b. In one example, a wavelength of light coupling that is measured is an infrared wavelength, and a probe 208 is a silicon-based photodiode detector.

One or more coupling structures 204 can be determined to be removed, in part, based on an amount of light coupling between the photonic components 202 vs a target amount of light coupling desired between the photonic components 202. An amount of light coupling can be measured using test setup 200, for example, in the form of scattering parameters (S-parameters). A target amount of light coupling desired between the photonic components 202 can depend in part on an application of the system, and can range between 0-100% of coupling, e.g., 10%, 25%, 50%, 85%, or the like. In some implementations, a target amount of light coupling can be a desired threshold amount of light coupling, e.g., at least 25% light coupling, or less than 40% light coupling. One or more coupling structures 204 from the subset of coupling structures 204 located between the two photonic components 202 can be removed until a measured amount of light coupling between the two photonic components 202 is the same as the target amount of light coupling.

In some implementations, an iterative process can be performed, where a measurement of the amount of light coupling between the two photonic components is collected using light source 206 and probe 208, and a coupling structure 204 is removed if the measured amount of light coupling is not the target amount of light coupling. The process is repeated until the measured amount of light coupling is the target amount of light coupling between the photonic components 202.

A particular coupling structure 212 can be removed using energy source 210 (e.g., a laser, electrical current device), where the energy source 210 can damage or destroy the coupling structure 212 rendering the amount of evanescent coupling through the coupling structure 212 to be negligible or nonexistent. In some implementations, energy source 210 is a laser that is tuned to a particular wavelength that is absorbed by the material of the coupling structures 204. Energy source 210 can be selected to have shallow depth of penetration into the material composition of the photonic device 201. In some implementations, energy source 210 is a device that produces a pulse of electrical current of sufficiently high power to destroy or damage the coupling structure 212.

In some implementations, a target amount of light coupling between the two photonic components 202 is a threshold amount of light coupling, where the amount of light coupling between the two photonic components 202 can be, for example, less than a particular value, or greater than a particular value. For example, the target amount of light coupling can be a maximum amount of light coupling between the two photonic components 202, and where coupling structures 204 are removed from the photonic device 201 until the amount of light coupling between the photonic components 202 is less than the target amount of light coupling.

In some implementations, a target amount of light coupling between the two photonic components 202 can be a range of light coupling amount, e.g., an amount of light coupling between 0-100%, between the two photonic components depending on a desired application for the two photonic components, e.g., between two waveguides.

In some implementations, removing one or more coupling structures can be utilized to remove destructive interference sources between two photonic components. Removing destructive interference sources can result in increased coupling between two photonic components, e.g., by removing parasitic evanescent coupling.

In some implementations, one or more properties of the photonic components 202 of the photonic device 201 are measured (e.g., supported modes in a waveguide, resonant frequencies, or other performance metrics). Coupling structures 204 that couple light into a particular photonic component 202 that may be determined to be not compliant with one or more performance metrics (e.g., not operating in a desired manner) can be removed such that the photonic component 202 is isolated from the rest of the photonic device 201. More details regarding isolating a photonic component by removing one or more coupling structures is discussed below with reference to FIG. 3.

In some implementations, an amount of coupling contribution from a specific structure can be measured. In one example, time-domain reflectometry can be used to understand and localize contributions from various structures in the system. Other techniques may be used that infer contributions from a collected series of empirical test measurements, where a system of equations can be solved to extract individual contributions for a particular structure.

In some implementations, determining to remove a particular coupling structure includes utilizing a performance model to determine expected performance of photonic components and select which photonic components should be isolated from the photonic device by removing coupling structures to the photonic component. FIG. 2B is a block diagram of an example operating environment 220 for using a performance model to select coupling structures to remove from the photonic device.

Operating environment 220 includes performance model 221 that can receive, as input, information describing two or more photonic components 222 and a set of coupling structures 224 for a photonic device 226 (e.g., photonic device 201) of a particular material composition 225. Photonic device 226 can be a photonic device 226 that includes a redundancy and/or excessive number of photonic components 222 and/or coupling structures 224 such that a particular target amount of light coupling 228 is possible between two particular photonic components 222 by selectively removing one or more coupling structures 224 from between the two photonic components 222.

In some implementations, performance model 221 utilizes a finite element method or finite difference time domain to analyze and solve for the subset of coupling structures 224 located between two photonic components 222 that results in a target amount of light coupling 228 between the two photonic components 222 (e.g., measured at a light output 208). The performance model 221 can include a finite element analysis, solver, and multi-physics simulation software that can use iterative simulations to find solutions to coupled systems of partial differential equations.

In some implementations, the performance model 221 can simulate a time-evolution of a waveform from a first photonic component to the second photonic component, including one or more supported modes in each of the photonic components 222. The one or more waveform modes can be modeled from a light input (e.g., from a light source 206) to light output (e.g., to a probe 208), where at least a portion of the waveform can be simulated to couple evanescently through a subset of coupling structures of the set of coupling structures 224. In some implementations, a portion of the evanescent waveform propagating in the first photonic component can couple into a subset of coupling structures 224 and subsequently couple from the subset of coupling structures into the second photonic component. The waveform at light output 208 can be determined.

In some implementations, a number of coupling structures in the subset of coupling structures 224 of the photonic device structure 226 can be modified until a waveform at the light output 208 is a target waveform and/or a target amount of light coupling 228. For example, a target amount of light coupling 228 at light output 208 can be between 0-100% of coupling, e.g., depending on the intended outcome or application, and the number of coupling structures in the subset of coupling structures can be four coupling structures 224 to achieve the desired waveform at the light output 208 and the target amount of light coupling 228.

The performance model 221 can provide, as output, a modified photonic device structure 230 including identifying one or more coupling structures 232 to be removed from the photonic device structure 226 to achieve the target light coupling amount 228. For example, a modified photonic device structure 230 can be the photonic device structure 226 that has one or more coupling structures 222 removed from between a particular set of two photonic components 224.

In some implementations, the modified photonic device structure 232 output from performance model 221 can be used to generate a set of post-fabrication instructions 234 for modifying a fabricated photonic device, e.g., photonic device 201. Post-fabrication instructions 234 can be, for example, operating instructions for operating an energy source to remove the one or more coupling structures 224 to modify a photonic device, as described in more detail with reference to FIG. 2A. For example, performance model 221 as described in FIG. 2B can output a particular set of one or more coupling structures 232 to remove from the photonic device structure 226 that results in a target amount of light coupling 228. Post-fabrication instructions 234 can be generated to operate a system including an energy source 210, e.g., as described with reference to FIG. 2A, to remove the particular coupling structures 232.

In some implementations, a modified photonic device structure (e.g., a photonic device including a particular subset of coupling structures) for the photonic device is determined using a design tool, which refers to a computational engine that determines a design for the photonic device that satisfies pre-specified performance criteria. Such an approach to design is referred to as "inverse design" and the computational engine for solving such problems is referred to as an "inverse design tool." FIG. 2C shows a block diagram of an example operating environment 240 for utilizing an inverse-design tool approach to select coupling structures to remove from a photonic device.

In certain implementations, the inverse design problem involves having a designer specify the performance criteria for the photonic device in terms of a "loss function," L (also sometimes referred to a "cost function"), which represents a variation of the performance of a given design for the photonic device from the specified performance (e.g., a target amount of light coupling between two photonic components). When L is below a specified threshold, e.g., $L \leq 0$, for a given design, it signifies that the specified performance has been met. By appropriately defining the loss, the inverse problem can therefore be expressed as finding a design, z, for the photonic device which satisfies $L \leq 0$.

Inverse design problems can be solved computationally through a combination of a simulation module and a specification loss module. The simulation module is used to mathematically model a physical system incorporating a given design for the photonic device using equations that describe the physical properties of the physical system, such as Maxwell's equations. The simulation module can also mathematically account for constraints involved in manufacturing (e.g., structure sizes and shapes and material properties) and operating the device (e.g., thermal effects). The specification loss module determines the loss for a particular design, effectively evaluating the performance of the device compared to the desired performance.

FIG. 2C shows an architecture for a computational inverse design tool 240 that uses a simulation module 242 and a specification loss module 244 to iteratively simulate the performance of a photonic device and determine a loss 246 for the device. Depending on whether the loss exceeds (e.g., $L>0$) or meets (e.g., $L \leq 0$) a threshold value, the design tool either updates (248) a structure of the device or produces a final structure 250 for the device.

In some implementations, a final structure 250 for the photonic device can include a subset of coupling structures of a set of coupling structures between two photonic components to achieve a desired performance metric, e.g., a target amount of light coupling between the two photonic components, where one or more coupling structures are removed from the set of coupling structures to leave the subset of coupling structures.

In general, design tool 240 uses a number of input parameters from a user in order to determine a final structure for the device. These include an initial structure 251 for the photonic device, a loss function 252, manufacturing constraints 253 and operating conditions 254.

Initial structure 251 generally includes a starting point for the composition and dimensions for the photonic device. In some implementations, an initial structure 251 can include a photonic device (e.g., photonic device 100) including multiple photonic components (e.g., photonic components 102) and multiple coupling structures (e.g., coupling structures 104). The initial structure 251 can be a fabricated photonic device with multiple coupling structures, such that one or more coupling structures can be removed in a post-fabrication process in order to achieve a particular performance metric for the photonic device, and where the inverse design tool can be used to determine the one or more photonic components to remove.

In one example, the initial structure 251 can include multiple redundant sets of fabricated photonic components and subsets of coupling structures between the respective sets of fabricated photonic components, where particular sets of photonic components can be selected from multiple redundant sets of photonic components, for example, based on desired performance metrics of the particular sets of photonic components. For example, the multiple redundant sets of fabricated photonic components can each have slightly varying performance metrics (e.g., resonant frequencies) due to variations in the fabrication process. A particular set of photonic components can be selected from the multiple sets of photonic components based on a particular desired performance metric for the photonic components.

In another example, the initial structure 251 can include a set of coupling structures between two photonic components, where each coupling structure between the two photonic components contributes an amount of light coupling via evanescent coupling between the two photonic components. One or more coupling structures can be removed from between the two photonic components in order to achieve a desired performance metric (e.g., a target amount of light coupling).

Loss function 252 is based on the desired performance of the photonic device and is typically defined by a desired electric field profile. In many cases, the desired electric field profile corresponds to an electric field output by the photonic device in response to a particular input or inputs. In some implementations, loss function 252 is a target amount of light coupling between two photonic components via evanescent coupling through a subset of coupling structures. For example, loss function 252 can be a desired electric field profile corresponding to a target amount of light coupling between two waveguides via evanescent coupling through a set of pillars that are located between the two waveguides. An input can be, for example, an electric field profile corresponding to an amount of light that is coupled into a first waveguide (e.g., light input 106) and a desired output can be, for example, an electric field profile corresponding to an amount of light that is output of the second waveguide (e.g., light output 108) that has been evanescently coupled between the two waveguides via the coupling structures.

In some implementations, loss function 252 can be a performance metric, e.g., a resonant frequency, an electric field profile corresponding to a set of supported modes, or the like, for one or more photonic components. For example, a loss function 252 can be a particular desired set of supported modes for a waveguide where the photonic device has multiple fabricated waveguides each having a particular set of supported modes.

Manufacturing constraints 253 incorporate constraints based on practical manufacturing considerations. For example, manufacturing constraints can be associated with an amount of spacing between components, size of one or more components, radius of curvature of one or more components, maximum cost of potential materials, availability of potential materials, and so forth. In some implementations, manufacturing constraints 253 may limit one or more coupling structures that can be removed from the photonic device based on, for example, a proximity to a photonic component that cannot be removed. For example, a particular coupling structure of multiple coupling structures that is located within a threshold distance of a photonic component cannot be removed without potentially damaging the photonic component, such that a different coupling structure may be selected to be removed instead.

Operating conditions 254 account for other physical properties of the system, such as sources or sinks of electromagnetic fields, operating temperature, etc. In some implementations, operating conditions 254 can include an operating temperature range of the photonic device, a light source (e.g., light source 206) that provides light input (e.g., light input 106). For example, light source that provides a light input into the photonic device can have associated properties, e.g., mode combination, wavelength range, coupling efficiency into the photonic component, power output, and the like. A target amount of coupling from a first photonic component to a second component can be affected by the characteristic of the light source, e.g., a maximum amount of light coupling can be limited by the input light 106 from the light source. In another example, an operating temperature of the photonic device including, for example a pair of waveguides, can affect the coupling efficiency of light from a first waveguide to a second waveguide, and may affect a mode combination at the light input 106 in order to achieve the target amount of light coupling between the photonic components.

Figure 2D:
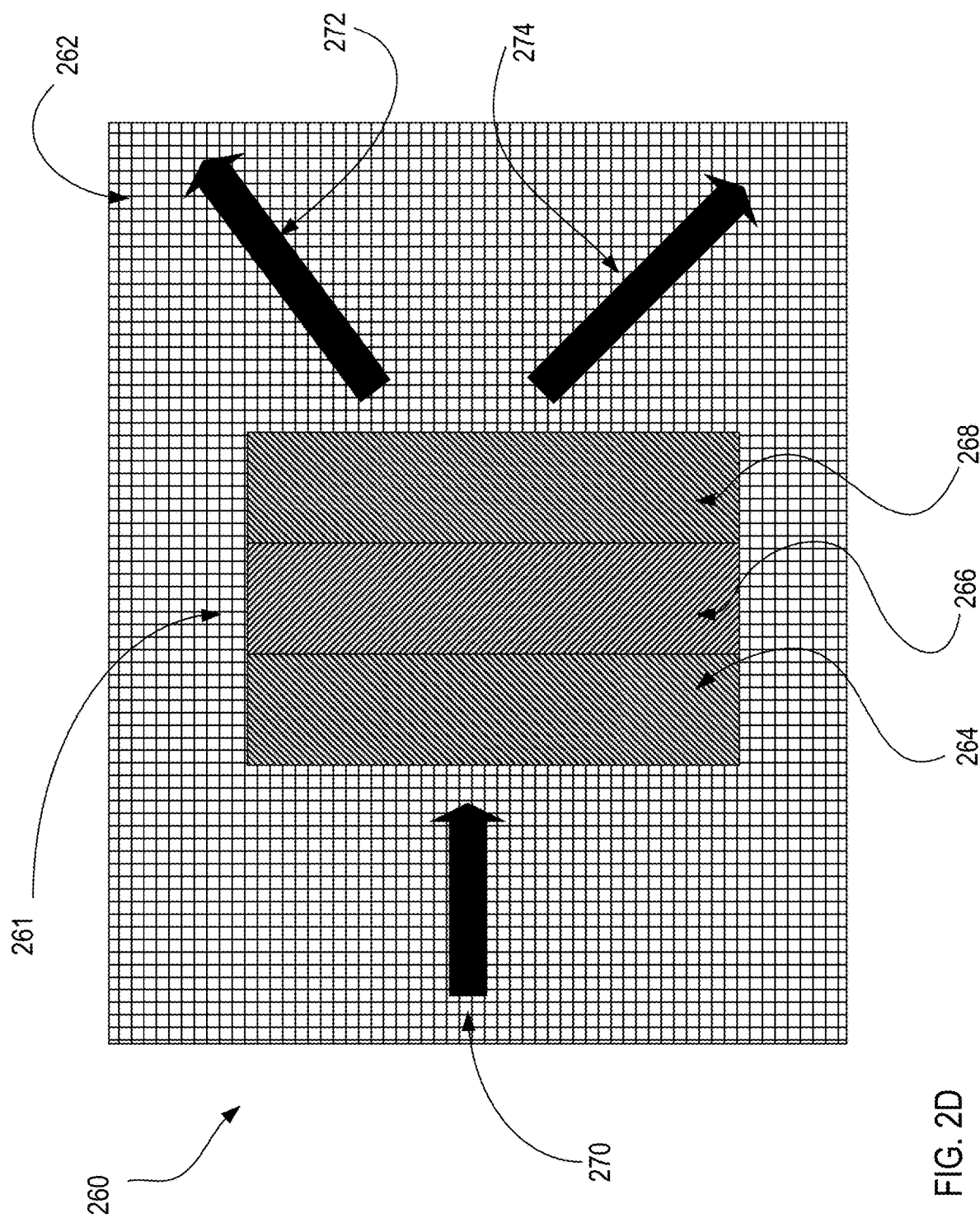
FIG. 2D shows an example layout of a photonic device represented in an inverse design tool environment.

Referring also to FIG. 2D, generally, initial structure 261 of the photonic device is defined within a simulation space 260 composed of voxels 262. Voxels are three-dimensional volume elements at which physical properties (e.g., refractive index, field values, and temperature) can be defined and/or calculated. Voxels also represent the atomic resolution of the system which is the smallest volume at which the structure of the photonic device can be computationally defined and manipulated. Each voxel 262 can be sub-wavelength (e.g., 0.5λ or less, 0.2λ or less, 0.1λ or less, 0.05λ or less) for a particular wavelength of interest in at least one dimension. In many cases, voxels are sub-wavelength in three dimensions.

As illustrated, initial structure 261 is composed of three regions 264, 266, 268. Region 264 and 268 include each a photonic component (e.g., photonic component 202), and region 266 includes a subset of coupling structures (e.g., coupling structures 204) that are located between the photonic components of regions 264 and 268. Each region extends across multiple voxels. Arrow 270 represents an input electromagnetic field incident on one side of initial structure 261. This field is a component of operating conditions 254, input into the simulation module. Arrows 272, 274 represent the desired performance (e.g., the desired electric field profile output by the photonic device in response to the input electromagnetic field) of the photonic device and the loss can be established as a difference, on a voxel by voxel basis, between the electromagnetic field corresponding to these arrows and the electromagnetic field that results from the interaction between the input electromagnetic field and initial structure 261.

Referring again to FIG. 2C, simulation module 242 determines the performance of the photonic device using a differentiable solver for Maxwell's equations to model electromagnetic fields resulting from the one or more sources interacting with the structure defined for the photonic device. In one form, Maxwell's equations can be expressed as:

$$\frac{\partial H}{\partial t} = -\frac{1}{\mu}(\nabla \times E - M_{source}); \text{ and } \frac{\partial E}{\partial t} = \frac{1}{\varepsilon}(\nabla \times H - J_{source}),$$

where E and H represent electric and magnetic fields, ε and μ represent permittivity and permeability of the material at each voxel, and $J_{source}$ and $M_{source}$ are electric and magnetic currents. Numerical solution of Maxwell's equations yields electric and magnetic field values at each voxel, from which design tool 240 can calculate loss 246 for each voxel using specification loss module 244.

In some embodiments, a finite difference time domain (FDTD) approach is used to solve Maxwell's equations. Details of such an approach can be found, for example, in Computational Electrodynamics: the Finite-Difference Time-Domain Method, Third Edition, by A. Taflove and S. C. Hagness (Artech House, 2005). Such an approach involves updating values of the electric and magnetic fields at each voxel through a series of incremental time steps. Mathematically, this update operation can be expressed by a function ϕ, where $$x_{i+1} = \phi(x_i, b_i, z)$$

for i=1, . . . , n. Here, n is the total number of time steps for the simulation, xi refers to the electric and magnetic fields at time step i, $b_i$ represents electric and magnetic sources at time step i, and z is a structural variable, corresponding to the topology of the photonic device. Additionally, the loss operation can be expressed as $L=f(x_1, \ldots, x_n)$ $L=f(x_1, \ldots, x_n)$ and takes as input all the computed fields and produces a single, real-valued scalar that can be minimized.

In such implementations, inverse design tool 240 can optimize a structure for the photonic device (i.e., final structure 250 in FIG. 2C) based on a structural gradient, $$\frac{dL}{dz}\frac{dL}{dz}$$

according to the formalism above. This structural gradient can be determined according to the relationship:

$$\frac{dL}{dE} = \sum_i \frac{dL}{dx_i}\frac{\partial x_i dL}{\partial z dz} = \sum_i \frac{dL}{dx_i}\frac{\partial x_i}{\partial z}.$$

The above calculations can be performed using a convolutional neural network formalism wherein the matrices representing the FDTD set of equations are sparsely populated such that the calculations can be efficiently performed using one or more tensor processing units.

An inverse design tool can be used to specify desired properties and/or performance metrics as input and generate a functional design that achieves the desired properties and/or performance metrics for a particular structure as an output. In some implementations, a differentiable solver for Maxwell's equations can be used to model the electromagnetic fields that result from one or more sources (e.g., light source 206) at a light input 250 interacting with a structure (e.g., a photonic device 246). A gradient of a loss function can be calculated for each voxel 250 of the set of voxels that define the photonic device 246. Each voxel 250 can be sub-wavelength in resolution for particular wavelengths of interest. A finite-difference time domain method including multiple time-steps can be modified to use tensor-flow methodology to mimic a convolutional neural network such that a solution (e.g., a gradient approximation to a first order) to the differentiable Maxwell's equations at each time-step can be found by gradient descent.

Figure 3:
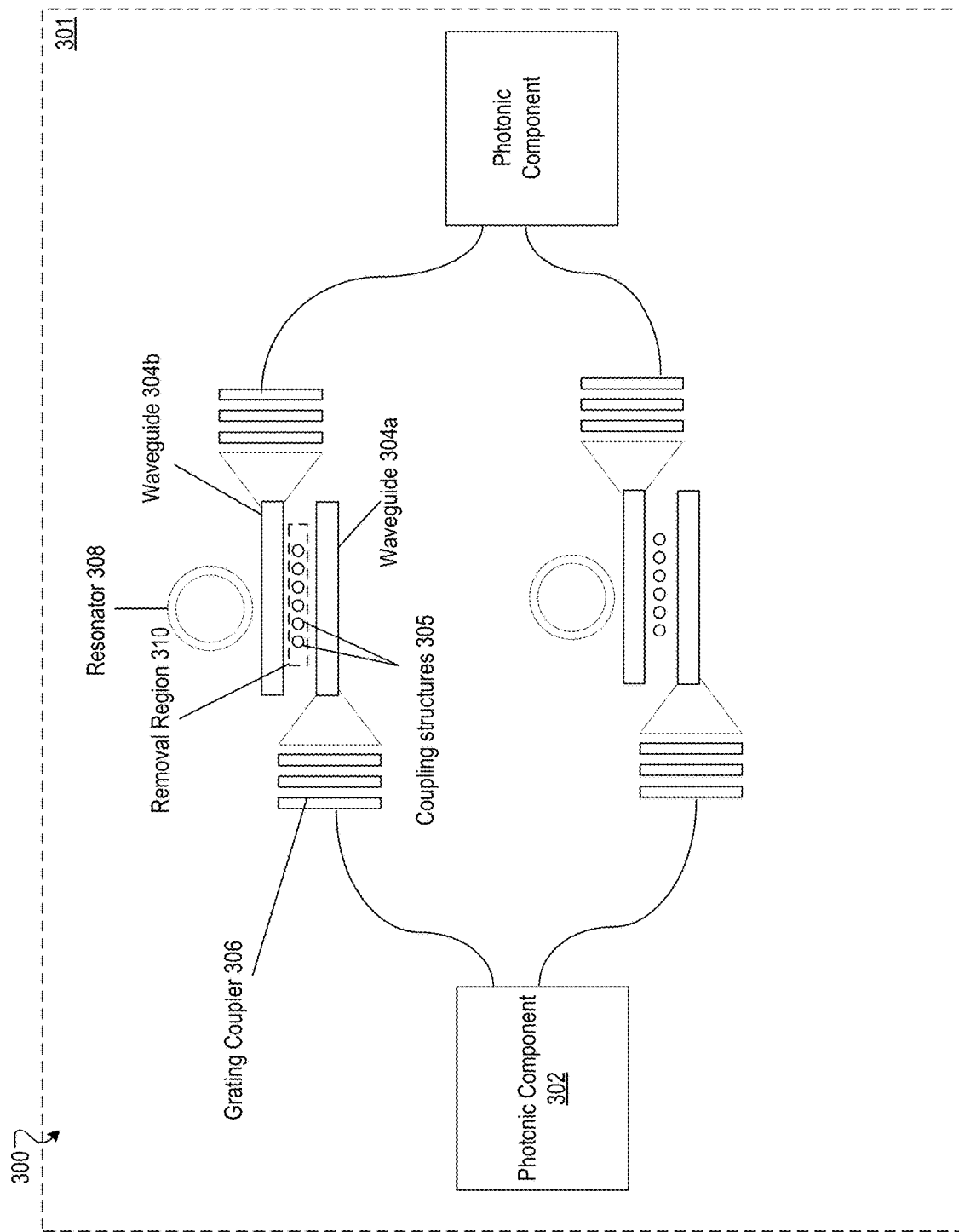
FIG. 3 shows another example layout of a photonic device including photonic components and coupling structures.

FIG. 3 shows another example layout 300 of a photonic device 301 including photonic components and coupling structures. In the example depicted in FIG. 3, light from a photonic component 302 is coupled to a waveguide 304 by a grating couple 306. Light from the waveguide 304, in turn, is coupled to a resonator 308 (e.g., a quantum dot resonator). In some implementations, a resonance wavelength or another performance metric of each resonator 308 can be measured and resonators 308 that are not measured to satisfy the performance metric can be identified and isolated from the photonic device 301.

In some implementations, the resonator 308 can be isolated from the photonic device 301 by removing one or more coupling structures 305, for example, removal region 310, wherein the coupling structures 305 couple light from waveguide 304a to waveguide 304b. Light from photonic component 302 is input to grating coupler 306 which couples light into waveguide 304a. Light from waveguide 304a is evanescently coupled to waveguide 304b via the coupling structures 305, and then coupled into resonator 308 from waveguide 304b. By removing removal region 310, the resonator 308 that is determined to be not within the performance metric is isolated from the photonic device 301 because no light can couple between the photonic component 302 and the resonator 308.

In some implementations, multiple waveguide/resonator pairs or other types of photonic components can be fabricated on a photonic device, where each of the waveguide resonator pairs can be fabricated to have a different performance metric, e.g., different supported modes, different supported wavelengths, or the like. A particular waveguide/resonator pair can be selected as a desired pair, e.g., based on a performance metric of the pair, and one or more of the other different waveguide/resonator pairs can be isolated from the photonic device by removing one or more coupling structures that allow for light coupling to the other waveguide/resonator pairs.

In some implementations, light coupling to multiple photonic components can be tuned for particular photonic devices. For example, three pairs of photonic components (e.g., three pairs of photonic components 202a, b) can each be tuned by modifying or removing a different number of coupling structures 224 between each set of photonic component pairs, such that the photonic device is tuned to have three different target amounts of light coupling, each for a particular pair of photonic components.

In some implementations, photonic components, e.g., filters or resonators, can be turned using the methods described herein. For example, a filter or resonator can be tuned by starting with a coupling that is larger than a desired coupling, e.g., a larger Q, larger frequency, etc., and tuning the coupling by removing coupling structure in post-fabrication process to reduce the resonance, e.g., to bring the frequency down to the desired range. If different amounts of coupling variation come from different evanescently coupled structures, then a final performance to be tuned using the post-fabrication process.

Figure 4:
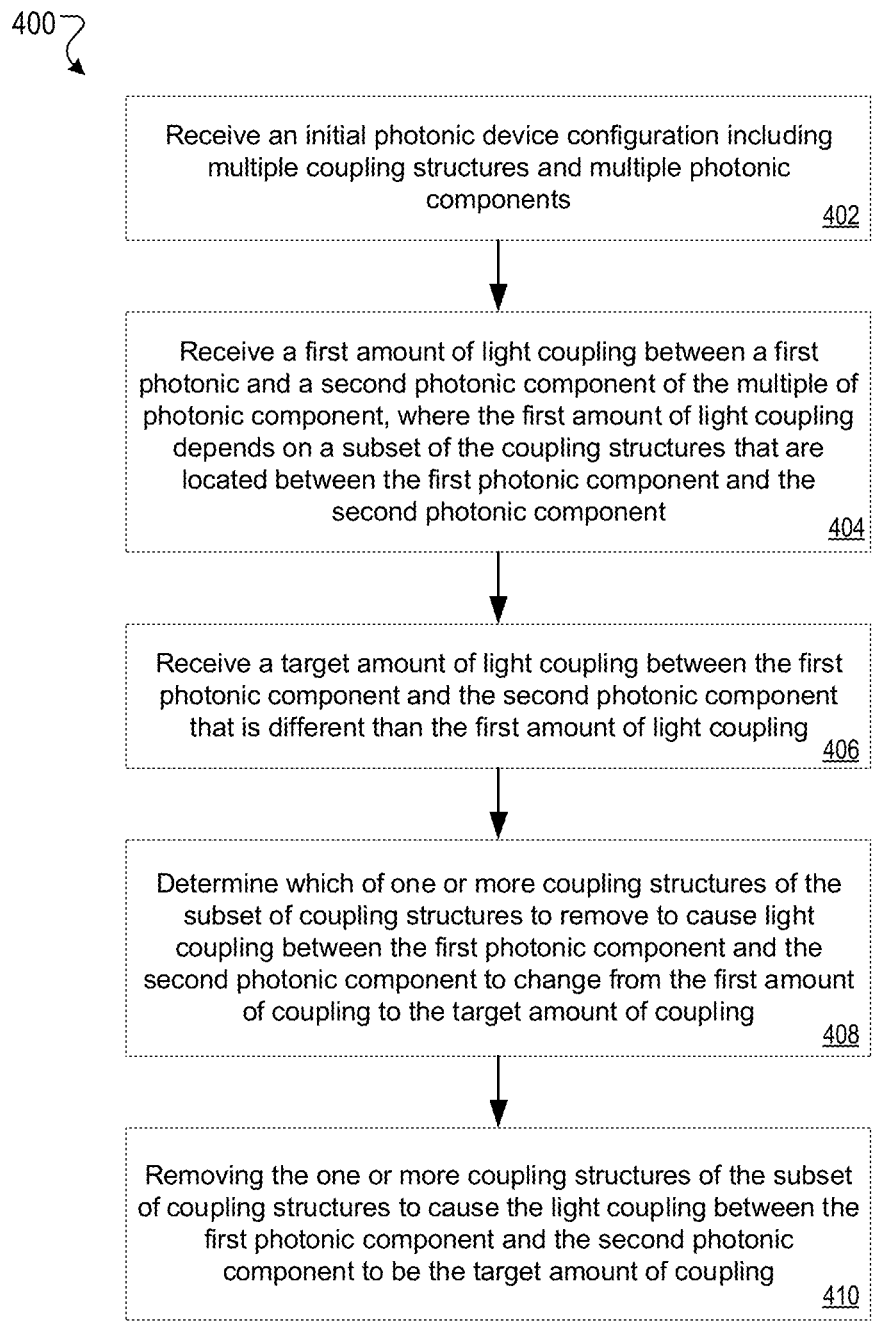
FIG. 4 is a flow diagram of an example process for selecting coupling structures to remove from a photonic device to adjust an amount of coupling between two photonic components.

FIG. 4 is a flow diagram of an example process for selecting coupling structures to remove from a photonic device to adjust an amount of coupling between two photonic components. An initial photonic device configuration is received including multiple coupling structures and multiple photonic components (402). One or more of the coupling structures allow for light to be couple via evanescent coupling between two or more photonic components of the multiple photonic components on the photonic device. For example, coupling structures can be a set of pillars by which at least a portion of a waveform in a first photonic component (e.g., a waveguide) can evanescently couple into a second photonic component (e.g., a different waveguide).

A first amount of light coupling between a first photonic component and a second photonic component of the multiple photonic components is received, where the first amount of light coupling between the first photonic component and the second photonic component depends upon a subset of the coupling structures that are located between the first photonic component and the second photonic component (404). The first amount of light coupling can be an amount of light coupling between a first photonic component and a second photonic component in a fabricated photonic device. In one example, the first amount of light coupling can be determined to be a binary value, e.g., light is coupled between the first photonic device and the second photonic device, or light is not coupled between the first photonic device and the second photonic device. In another example, multiple pairs of photonic components can be measured, each pair of photonic components having a different first amount of light coupling between the pair of photonic components.

A target amount of light coupling between the first photonic component and the second photonic component is received, where the target amount of light coupling between the first photonic component and the second photonic component is different than the first amount of light coupling (406).

In some implementations, the target amount of light coupling can be a threshold value, where a target amount of light coupling is below a threshold amount of light coupling or above a threshold amount of light coupling. For example, a first amount of light coupling can range between 0-100%, e.g., less than 40% coupling, greater than 95% coupling, depending on the application or desired outcome, between the first photonic component and the second photonic component.

In some implementations, a target amount of light coupling can be a binary value, e.g., there is no light coupled between the first photonic component and the second photonic component. For example, for a particular modified photonic device, it may be desired to have zero light coupling between a first photonic device and a second photonic device.

One or more coupling structures of the subset of coupling structures located between the first photonic component and the second photonic component are determined to be removed, where removing the one or more coupling structures causes light coupling between the first photonic component and the second photonic component to change from the first amount of coupling to the target amount of coupling (408). Each coupling structure of the subset of coupling structures can contribute a fractional amount of light coupling of a total amount of light coupling between the first photonic device and the second photonic device. In one example, a coupling structure from the subset of coupling structures between the first and second photonic devices is removed iteratively until a target amount of light coupling is reached, e.g., empirically measured or theoretically calculated.

In some implementations, as mentioned above, a target amount of light coupling can be a binary value, where, if the target amount of light coupling is zero light coupling (e.g., null value), then all of the coupling structures can be removed. In another embodiment, coupling structures are removed iteratively until an amount of light coupling between the first photonic component and the second photonic component is negligible.

The one or more coupling structures of the subset of coupling structures are removed to cause the light coupling between the first photonic component and the second photonic component to be the target amount of coupling (410). The coupling structures can be removed, for example, using a localized high-energy source (e.g., energy source 210). In one example, an energy source can be a laser that is used to burn or damage the coupling structures such that no evanescent light can be coupled into the coupling structures (e.g., that the evanescent waveform is not a supported waveform in the coupling structure).

In some implementations, a set of instructions including information identifying the one or more coupling structures to be removed from the photonic device in order for the amount of light coupling between the first photonic component and the second photonic component to be a target amount of coupling. The set of instructions can be provided to a system, e.g., as described in more detail with reference to FIG. 2A, as operating instructions to the system for removing the coupling structures.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

In some aspects, implementations described in the present disclosure may rely on machine learning engines and machine learning algorithms to perform generative design tasks. Generative design may, in some aspects, mimic an evolutionary problem-solving process, which uses inputs such as design goals, computes hundreds (if not thousands or millions) of potential solutions, and selects one or more best solutions from the multitude of solution permutations. Indeed, in some aspects, machine learning engines applied to a generative design process may generate or process thousands—or even millions—of design choices, test configurations and learn from each iterative solution. Thus, aspects of the described implementations may use the machine learning engines in a generative design process to generate unique and bespoke solutions beyond those that a human being, alone, could create, to arrive at the best design solution. In some aspects, the machine learning engines and algorithms of the generative design process may rely on algorithmic and parametric modeling within a process that includes a design schema, one or more machine learning engines configured to create variations, and one or more machine learning engines configured to select desirable outcomes.

Figure 5:
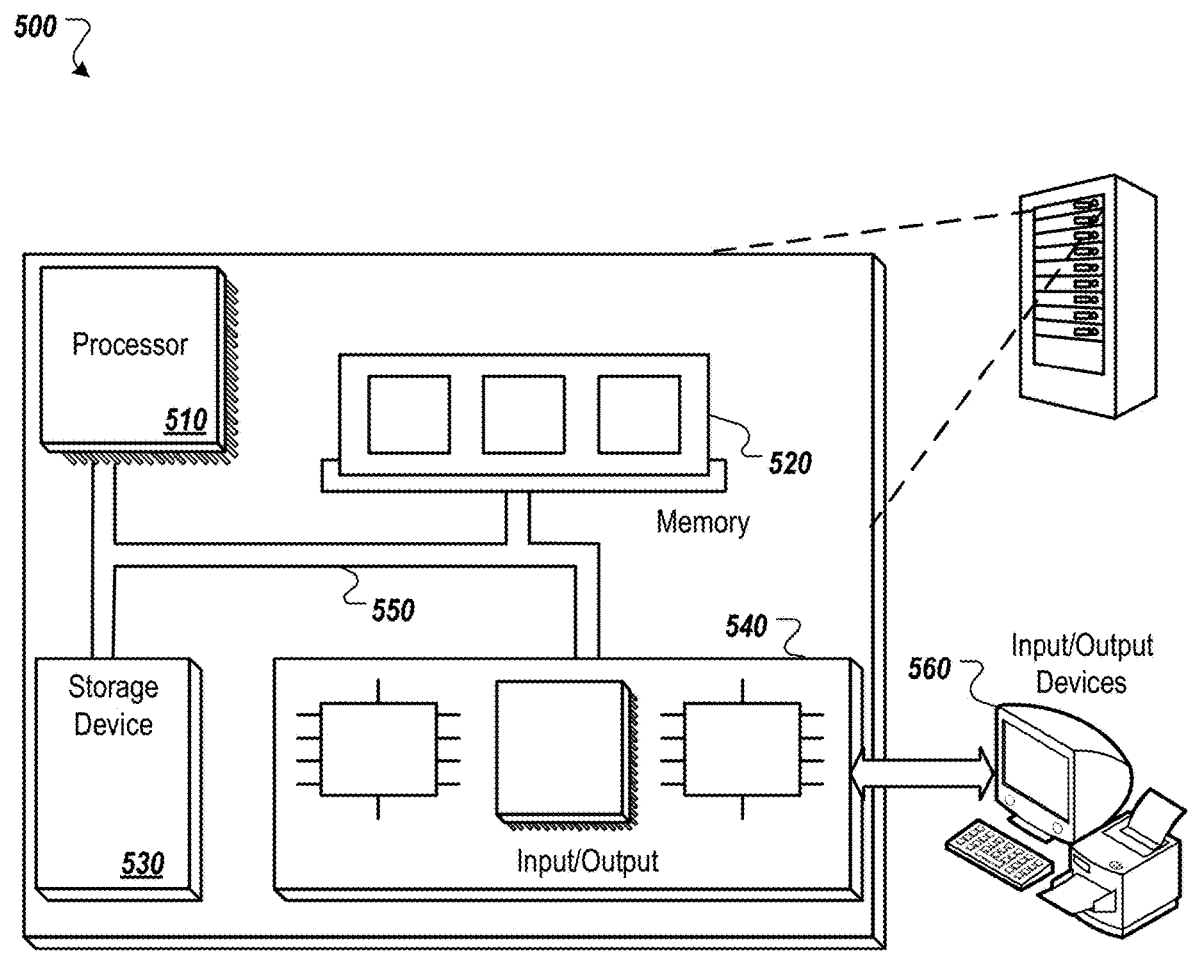
FIG. 5 is a schematic diagram of an example computer system.

FIG. 5 is a schematic diagram of an example computer system 500. The system 500 can be used to carry out the operations described in association with any of the computer-implemented methods described previously, according to some implementations. In some implementations, computing systems and devices and the functional operations described in this specification can be implemented in digital electronic circuitry, in tangibly-embodied computer software or firmware, in computer hardware, including the structures disclosed in this specification (e.g., machine learning engine(s)) and their structural equivalents, or in combinations of one or more of them. The system 500 is intended to include various forms of digital computers, such as laptops, desktops, workstations, personal digital assistants, servers, blade servers, mainframes, and other appropriate computers, including vehicles installed on base units or pod units of modular vehicles. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 560 includes a keyboard and/or pointing device. In another implementation, the input/output device 560 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machinereadable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for modifying a photonic device comprising:
   receiving, by a data processing apparatus comprising a computational inverse design tool, an initial photonic device configuration of the photonic device comprising a plurality of coupling structures and a plurality of photonic components;
   receiving, by the computational inverse design tool, while modifying the plurality of coupling structures, information about a measured amount of light coupling between a first photonic component and a second photonic component of the plurality of photonic components, wherein the amount of light coupling between the first photonic component and the second photonic component depends upon coupling structures that are located between the first photonic component and the second photonic component;
   receiving, by the computational inverse design tool, information about a target amount of light coupling between the first photonic component and the second photonic component; and
   determining in real-time with receiving the information about the measured amount of light coupling by the computational inverse design tool, further modifications to the coupling structures that are located between the first photonic component and the second photonic component to reduce a difference between the measured amount of light coupling and the target amount of light coupling, comprising:

defining a loss function within a simulation space composed of a plurality of voxels, the simulation space encompassing the photonic device including the coupling structures and the first photonic component and the second photonic component, the loss function corresponding to a target light coupling profile between the first photonic component and the second photonic component via evanescent coupling through the coupling structures that are located between the first photonic component and the second photonic component, and wherein the target light coupling profile comprises a relationship between the coupling structures that are located between the first photonic component and the second photonic component and an amount of evanescent coupling of an electromagnetic field between the first photonic component to the second photonic component via the coupling structures;

determining values for at least one structural parameter and/or at least one functional parameter to calculate a loss determined according to the loss function, wherein the at least one structural or functional parameter corresponds to a structure of the photonic device; and defining a final structure of the photonic device based on the values for the one or more structure and/or functional parameters;

wherein the further modifications to the coupling structures comprise determining, by the computational inverse design tool, a particular coupling structure of the coupling structures located between the first photonic component and second photonic component to remove.

2. The method of claim 1, wherein determining values for the at least one structural parameter and/or the at least one functional parameter comprises using a finite-difference time domain solver to solve Maxwell's equations.

3. The method of claim 1, wherein the further modifications to the coupling structures comprises empirical measurements performed on the photonic device including measuring the amount of light coupling between the first photonic component and the second photonic component.

4. The method of claim 1, wherein the further modifications to the coupling structures comprises utilizing a performance model to determine expected performance of photonic components and select which photonic components should be isolated from the photonic device by removing coupling structures to the photonic component.

5. The method of claim 1, further comprising removing coupling structures of the coupling structures located between the first photonic component and the second photonic component.

6. The method of claim 5, wherein removing the coupling structures includes using a high powered energy source to alter or destroy the coupling structures.

7. The method of claim 1, wherein the plurality of coupling structures are pillars and the plurality of photonic components include one or more of a waveguide, a quantum dot, or a resonator.

8. A system for designing a photonic device comprising:
a data processing apparatus including one or more processors and a computer-readable storage device coupled to the one or more processors and having instructions stored thereon which, when executed by the one or more processors, cause the one or more processors to perform operations, the operations comprising:

receiving, by a data processing apparatus comprising a computational inverse design tool, an initial photonic device configuration of the photonic device comprising a plurality of coupling structures and a plurality of photonic components;

receiving, by the computational inverse design tool, while modifying the plurality of coupling structures, information about a measured amount of light coupling between a first photonic component and a second photonic component of the plurality of photonic components, wherein the amount of light coupling between the first photonic component and the second photonic component depends upon coupling structures that are located between the first photonic component and the second photonic component;

receiving, by the computational inverse design tool, information about a target amount of light coupling between the first photonic component and the second photonic component; and determining in real-time with receiving the information about the measured amount of light coupling by the computational inverse design tool, further modifications to the coupling structures that are located between the first photonic component and the second photonic component to reduce a difference between the measured amount of light coupling and the target amount of light coupling, comprising:

defining a loss function within a simulation space composed of a plurality of voxels, the simulation space encompassing the photonic device including the coupling structures and the first photonic component and the second photonic component, the loss function corresponding to a target light coupling profile between the first photonic component and the second photonic component via evanescent coupling through the coupling structures that are located between the first photonic component and the second photonic component, and wherein the target light coupling profile comprises a relationship between the coupling structures that are located between the first photonic component and the second photonic component and an amount of evanescent coupling of an electromagnetic field between the first photonic component to the second photonic component via the coupling structures;

determining values for at least one structural parameter and/or at least one functional parameter to calculate a loss determined according to the loss function, wherein the at least one structural or functional parameter corresponds to a structure of the photonic device; and defining a final structure of the photonic device based on the values for the one or more structure and/or functional parameters;

wherein the further modifications to the coupling structures comprise determining, by the computational inverse design tool, a particular coupling structure of the coupling structures located between the first photonic component and second photonic component to remove.

9. The system of claim 8, further comprising:
a light source;
an energy source; and
a probe,
wherein the light source, energy source, and probe are in data communication with the data processing apparatus and wherein receiving the first amount of light coupling between the first photonic component and the second photonic component of the plurality of photonic components comprises:
   providing, by the light source and to the first photonic component, an amount of light input into the first photonic component;
   measuring, by the probe and from the second photonic component, an amount of light output from the second photonic component; and
   determining, from the amount of light input and the amount of light output, the first amount of light coupling between the first photonic component and the second photonic component, wherein the first amount of light coupling between the first photonic component and the second photonic component depends upon the coupling structures that are located between the first photonic component and the second photonic component.

10. The system of claim 9, further comprising:
removing, using the energy source, the particular coupling structure of the coupling structures located between the first photonic component and the second photonic component, wherein removing the particular coupling structure comprises using the energy source to damage or destroy the particular coupling structure.

11. The system of claim 9, wherein the energy source is a high powered energy source to alter or destroy the particular coupling structure.

12. The system of claim 8, wherein determining values for the at least one structural parameter and/or the at least one functional parameter comprises using a finite-difference time domain solver to solve Maxwell's equations.

13. The system of claim 8, wherein further modifications to the coupling structures comprises utilizing a performance model to determine expected performance of photonic components and select which photonic components should be isolated from the photonic device by removing coupling structures to the photonic component.

14. The system of claim 8, wherein the plurality of coupling structures are pillars and the first and second photonic components include one or more of a waveguide, a quantum dot, or a resonator.

15. One or more non-transitory computer-readable storage media coupled to one or more processors and having instructions stored thereon which, when executed by the one or more processors, cause the one or more processors to perform operations, the operations comprising:
   receiving, by a data processing apparatus comprising a computational inverse design tool, an initial photonic device configuration of the photonic device comprising a plurality of coupling structures and a plurality of photonic components;
   receiving, by the computational inverse design tool, while modifying the plurality of coupling structures, information about a measured amount of light coupling between a first photonic component and a second photonic component of the plurality of photonic components, wherein the amount of light coupling between the first photonic component and the second photonic component depends upon coupling structures that are located between the first photonic component and the second photonic component;
   receiving, by the computational inverse design tool, information about a target amount of light coupling between the first photonic component and the second photonic component; and
   determining in real-time with receiving the information about the measured amount of light coupling by the computational inverse design tool, further modifications to the coupling structures that are located between the first photonic component and the second photonic component to reduce a difference between the measured amount of light coupling and the target amount of light coupling, comprising:
      defining a loss function within a simulation space composed of a plurality of voxels, the simulation space encompassing the photonic device including the coupling structures and the first photonic component and the second photonic component, the loss function corresponding to a target light coupling profile between the first photonic component and the second photonic component via evanescent coupling through the coupling structures that are located between the first photonic component and the second photonic component, and wherein the target light coupling profile comprises a relationship between the coupling structures that are located between the first photonic component and the second photonic component and an amount of evanescent coupling of an electromagnetic field between the first photonic component to the second photonic component via the coupling structures;
      determining values for at least one structural parameter and/or at least one functional parameter to calculate a loss determined according to the loss function, wherein the at least one structural or functional parameter corresponds to a structure of the photonic device; and
      defining a final structure of the photonic device based on the values for the one or more structure and/or functional parameters;
   wherein the further modifications to the coupling structures comprise determining, by the computational inverse design tool, a particular coupling structure of the coupling structures located between the first photonic component and second photonic component to remove.

16. The computer-readable storage media of claim 15, wherein determining values for the at least one structural parameter and/or the at least one functional parameter comprises using a finite-difference time domain solver to solve Maxwell's equations.

17. The computer-readable storage media of claim 15, wherein the further modifications to the coupling structures comprises empirical measurements performed on the photonic device including measuring the amount of light coupling between the first photonic component and the second photonic component.

* * * * *